United States Patent
Henderson et al.

(10) Patent No.: US 7,308,261 B2
(45) Date of Patent: Dec. 11, 2007

(54) METHOD FOR QUICK REGISTRATION FROM A MOBILE DEVICE

(75) Inventors: Irvin Henderson, Palo Alto, CA (US); Naveen D. Sanjeeva, Milpitas, CA (US); Thyagarajapuram Swaminathan Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 61 days.

(21) Appl. No.: 11/115,080

(22) Filed: Apr. 25, 2005

(65) Prior Publication Data

US 2006/0240824 A1 Oct. 26, 2006

(51) Int. Cl.
*H04Q 7/20* (2006.01)

(52) U.S. Cl. ............... 455/435.1; 455/435.2; 455/411; 455/434; 455/466; 455/410

(58) Field of Classification Search ............ 455/435.1, 455/435.2, 435.3, 434, 466, 411, 410; 370/328, 370/349, 496
See application file for complete search history.

(56) References Cited

U.S. PATENT DOCUMENTS

| | | | |
|---|---|---|---|
| 5,758,088 A | 5/1998 | Bezaire et al. | |
| 6,021,433 A | 2/2000 | Payne et al. | |
| 6,167,426 A | 12/2000 | Payne et al. | |
| 6,735,614 B1 | 5/2004 | Payne et al. | |
| 2002/0084888 A1* | 7/2002 | Jin | 340/7.21 |
| 2004/0090930 A1* | 5/2004 | Lee et al. | 370/328 |
| 2005/0020270 A1* | 1/2005 | Buckley | 455/445 |
| 2005/0286489 A1* | 12/2005 | Shin et al. | 370/352 |
| 2006/0199598 A1* | 9/2006 | Lee et al. | 455/466 |

* cited by examiner

*Primary Examiner*—Rafael Perez-Gutierrez
*Assistant Examiner*—Khai Nguyen
(74) *Attorney, Agent, or Firm*—Darby & Darby PC; Jamie L. Wiegand

(57) ABSTRACT

A system, apparatus, and method is directed towards managing a quick registration of a mobile device over a network. The quick registration is directed at enabling an end-user to conveniently register a mobile device to be useable for such communications sessions, as an instant messaging (IM) session, and the like. The invention employs a pre-determined extension to a short code that instructs a server to register the mobile device sending the message. The message includes an account identifier along with a password to the account. The message may be a single message line, thereby providing a quick and convenient mechanism for registering the mobile device. The server receives the message along with a mobile device identifier, and stores a mapping relationship between the account identifier and the mobile device identifier after validating the password. In one embodiment, the message includes a command that the mobile device also be logged into an IM session.

22 Claims, 5 Drawing Sheets

METHOD FOR QUICK REGISTRATION FROM A MOBILE DEVICE

FIELD OF THE INVENTION

The invention relates generally to mobile communications, and more particularly but not exclusively to managing a quick registration of a mobile device to be useable for an instant messaging (IM) session.

BACKGROUND OF THE INVENTION

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices.

With such a variety of mobile devices, one can receive email messages, Instant Messaging (IM) messages, and Short Message Service (SMS) text messages, in addition to regular voice calls. With the growing proliferation of such mobile devices, it is becoming ever more important to ensure that employees, friends, and family are able to remain seamlessly connected to each other. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, apparatus, and method for managing a quick registration of a mobile device over a network. The quick registration is directed at enabling an end-user to conveniently register a mobile device to be useable for such communications sessions, as an instant messaging (IM) session, and the like. The invention employs a pre-determined shortcode or extension to a short code that instructs a server to register the mobile device sending the message. The message may include an account identifier along with a password or other credentials to the account. The message may be a single line (e.g., absent multiple line return controls, rather than a sequence of messages), thereby providing a quick and convenient mechanism for registering the mobile device. In one embodiment, the message is a Short Message Service (SMS) message. A server receives the message along with a mobile device identifier, and stores a mapping relationship between the account identifier and the mobile device identifier after authenticating the account identifier. In one embodiment, the message further includes a request that the mobile device also be logged into a communications session, such as an IM communications session.

Illustrative Operating Environment

Figure 1:
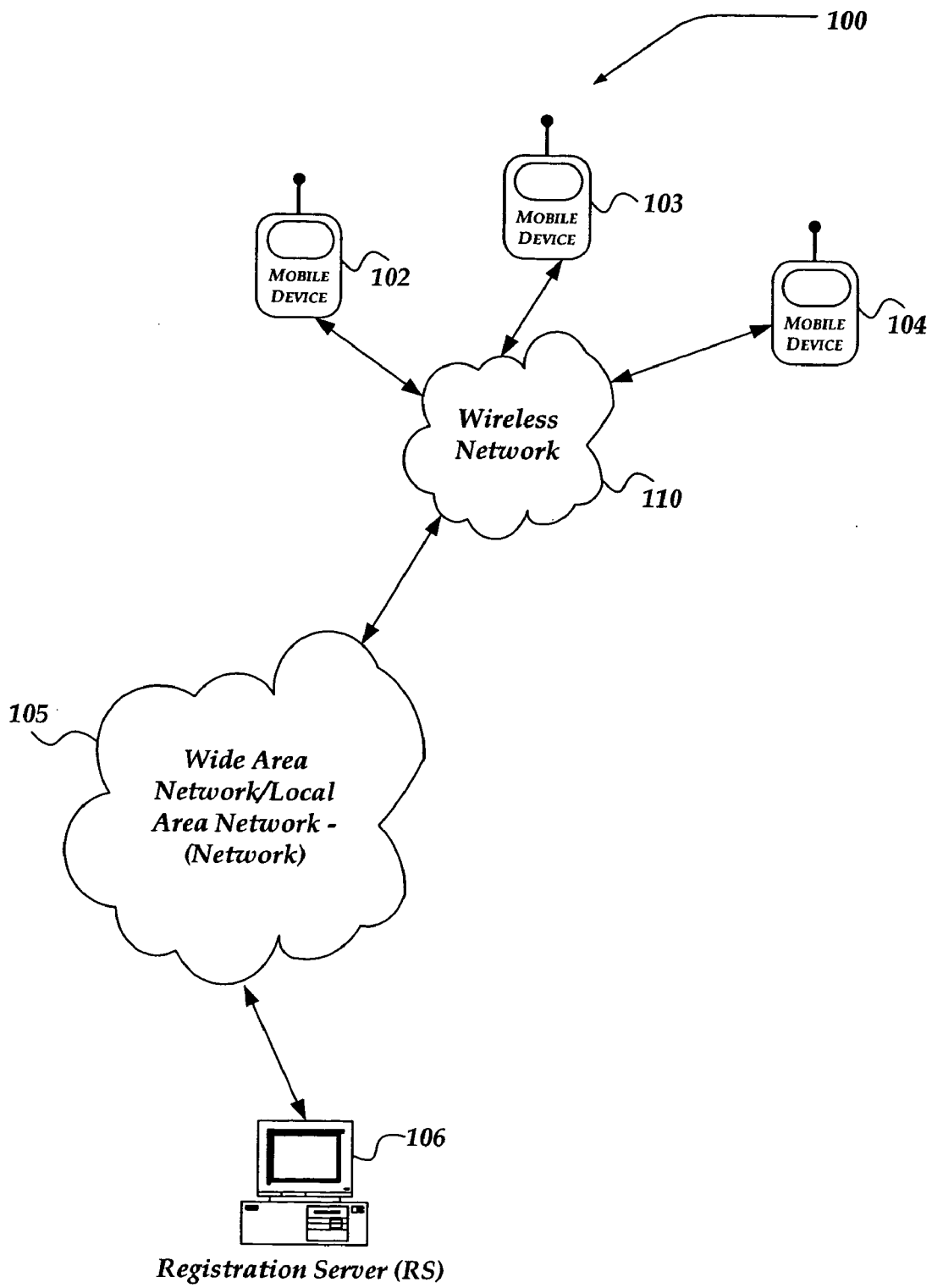
FIG. 1 shows a functional block diagram illustrating one embodiment of an environment for practicing the invention.

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Registration Server (RS) 106, and mobile devices 102-104.

Generally, mobile devices 102-104 may include virtually any portable computing device capable of receiving and sending a message over a network, such as network 105, wireless network 110, and the like, to and from another computing device, such as RS 106, another mobile device, and the like. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to RS 106, and other computing devices.

Mobile devices 102-104 may be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as RS 106, and the like. However, the present invention is not limited to these message protocols, and virtually any other message protocol may be employed.

Mobile devices 102-104 may be further configured to enable a user to participate in communications sessions, such as IM sessions, and the like, and to transfer an existing communications session, and the like, between devices. As such, mobile devices 102-104 may include a client application that is configured to manage various actions on behalf of the client device. For example, the client application may enable a user to interact with the browser application, email application, IM applications, SMS application, and the like, to manage signing into and/or transferring of a communications session, such as an IM session, between the devices. In one embodiment, the client application might be the SMS application. In addition, the client application may be configured to enable an end-user to quickly and conveniently register the mobile device for use in participating in a communications session, such as an IM session. In one embodiment, the client application includes an end-user input component that is configured to receive a message, such as a single line message for use in registering the mobile device. The single line message may include numeric, text, alphanumeric characters, symbols, and the like. In addition, the client application may employ, for example, a process to register the mobile device, such as is described below in conjunction with FIG. 4.

Mobile devices 102-104 may further be configured to include a client application that enables the end-user to log into an end-user account that may be managed by another computing device, such as RS 106. Such end-user account, for example, may be configured to enable the end-user to receive emails, send/receive IM messages, SMS messages, access selected web pages, and the like. Moreover, the end-user account may be further configured to enable the end-user authorization to automatically start an IM session, or other communications session, on a mobile device.

Wireless network 110 is configured to couple mobile device 104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple RS 106 and its components with other computing devices, including, mobile devices 102-104, RS 106, and through wireless network 110 to mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between RS 106 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of RS 106 is described in more detail below in conjunction with FIG. 3. Briefly, however, RS 106 may include any computing device capable of connecting to network 105 to enable an end-user to register a mobile device to be useable for managing an IM session, and other communications sessions. Devices that may operate as RS 106 include personal computers desktop computers, multi-processor systems, microprocessor-based or programmable consumer electronics, network PCs, servers, and the like.

Although FIG. 1 illustrates RS 106 as a single computing device, the invention is not so limited. For example, one or more functions of RS 106 may be distributed across one or more distinct computing devices. For example, IM sessions may be managed by a different computing device than are web services. Similarly, SMS sessions, session transfers, authentication, and the like, may reside on different computing devices, without departing from the scope or spirit of the present invention.

Illustrative Mobile Client Environment

Figure 2:
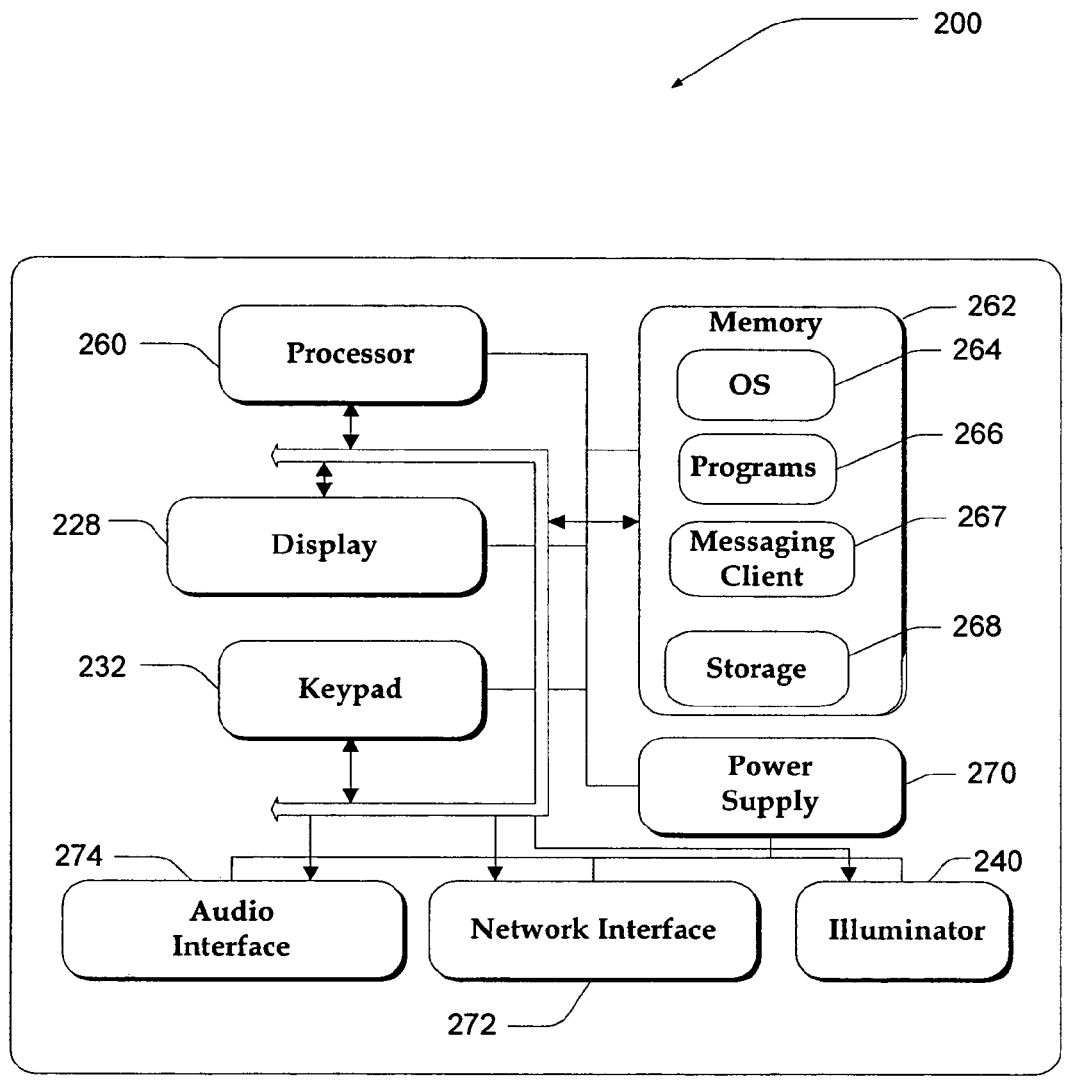
FIG. 2 shows one embodiment of a mobile device that may be included in a system implementing the invention.

FIG. 2 is a functional block diagram illustrating an embodiment of one embodiment of communications device 200 for practicing the present invention. In one embodiment of the present invention communications device 200 is implemented as a mobile communications device, such as a PDA, smart phone, and the like that is arranged to send and receive voice communications, and other messages, such as IM messages, SMS messages, and the like via one or more wireless communication interfaces. Communications device 200 may also include handheld computers, tablet computers, personal computers, multiprocessor systems, microprocessor-based or programmable consumer electronics, network PCs, wearable computers, and the like. Communications device 200 may be represent, for example, mobile devices 102-104 of FIG. 1.

Communications device 200 may include many more components than those shown in FIG. 2. The components shown, however, are sufficient to disclose an illustrative embodiment for practicing the invention.

As shown in the figure, communications device 200 includes processor 260, memory 262, display 228, and keypad 232. Memory 262 generally includes both volatile memory (e.g., RAM) and non-volatile memory (e.g., ROM, Flash Memory, or the like). Communications device 200 includes operating system 264, which may be resident in memory 262 and configured to execute on processor 260 for use in controlling operations of communications device 200. It will be appreciated that this component may include a general purpose operating system such as a version of UNIX, LINUX™, and the like, or a specialized mobile communication operating system such as Windows Mobile™, Symbian®, or the like. The operating system may further include, or interface with a Java Virtual Machine module that enables control of various hardware components and/or operating system operations via Java application programs, and the like.

Keypad 232 may be a push button numeric dialing pad (such as on a typical telephone), a multi-key keyboard (such as a conventional keyboard), and the like. Display 228 may be a liquid crystal display (LCD), gas plasma, light emitting diode (LED), or any other type of display useable in a mobile communications device. For example, display 228 may be touch-sensitive, and may then also act as an input device enabling entry of stencil input, touch display, and so forth.

One or more programs 266 may be loaded into memory 262 and run on the operating system 264. Programs 266 may include computer executable instructions which, when executed by mobile communications device 200, also transmit, receive, and/or otherwise process web pages, audio, videos, graphics, and enable telecommunication with another computing device. Other examples of programs 266 include calendars, contact managers, task managers, transcoders, email programs, scheduling programs, browsers, word processing programs, spreadsheet programs, games, and the like. In addition, memory 262 may include messaging client 267.

Messaging client 267 may include computer executable instructions, which may be run under control of operating system 264 to enable and manage SMS, MMS, IM, email, and/or other messaging services for mobile communications device 200. However, the invention is not limited to these examples, and others may be employed. Messaging client 267 may, for example, employ a process such as described below in conjunction with FIG. 4 to perform at least some actions, including such as registering communications device 200 to be useable to manage an IM session, and/or other communications sessions.

Communications device 200 also includes non-volatile storage 268 within memory 262. Non-volatile storage 268 may be used to store persistent information which is intended not to be lost if the communications device 200 is powered down. Programs 266 may use and store information in storage 268, such as e-mail or other messages used by an e-mail application, databases, documents used by a word processing application, and the like. A synchronization application may also reside on communications device 200 and be programmed to interact with a corresponding synchronization application resident on another computer to keep the information stored in storage 268 synchronized with corresponding information stored at the other computer.

Communications device 200 also may include power supply 270, which may be implemented as one or more batteries, solar devices, and the like. Power supply 270 might further include an external power source, such as an AC adapter or a powered docking cradle that supplements or recharges the batteries.

Communications device 200 is also shown with two types of external notification mechanisms: illuminator 240 and audio interface 274. These devices may be directly coupled to power supply 270 so that when activated, they remain on for a duration dictated by the notification mechanism even though processor 260 and other components might shut down to conserve battery power. Illuminator 240 may be programmed to remain on indefinitely until the user takes action to indicate the powered-on status of the device. Audio interface 274 may be used to provide audible signals to and receive audible signals from the user. For example, audio interface 274 may be coupled to a speaker for providing audible output and to a microphone for receiving audible input, such as to facilitate a telephone conversation.

Communications device 200 also includes network interface 272 that performs the function of transmitting and receiving external communications. Network interface 272 facilitates, for example, wireless connectivity between communications device 200, and the outside world, via a communications carrier or service provider. Transmissions to and from network interface 272 may be conducted under control of operating system 264. In other words, communications received by network interface 272 may be disseminated to programs 266 via operating system 264, and vice versa. Network interface 272 also allows communications device 200 to communicate with other computing devices, such as over a network, using a variety of wired communications mechanisms and technologies, including global system for mobile communications (GSM), code division multiple access (CDMA), time division multiple access (TDMA), user datagram protocol (UDP), transmission control protocol/Internet protocol (TCP/IP), SMS, general packet radio service (GPRS), Wireless Application Protocol (WAP), ultra wide band (UWB), IEEE 802.16 Worldwide Interoperability for Microwave Access (WiMax), and the like. Network interface 272 is sometimes known as a transceiver or transceiving device, and is one example of a communication media.

Mobile communications device 200 may employ one or more components above to provide information identify itself during an external communications with another device. Mobile communications device 200 may uniquely identify itself through any of a variety of mechanisms, including a phone number, Mobile Identification Number (MIN), an electronic serial number (ESN), or other mobile device identifier. The information may also indicate a content format that mobile device 104 is enabled to employ, a device type, capability, and the like. The information may be provided as part of another message, and/or as a separate message to the other device.

Illustrative Server Environment

Figure 3:
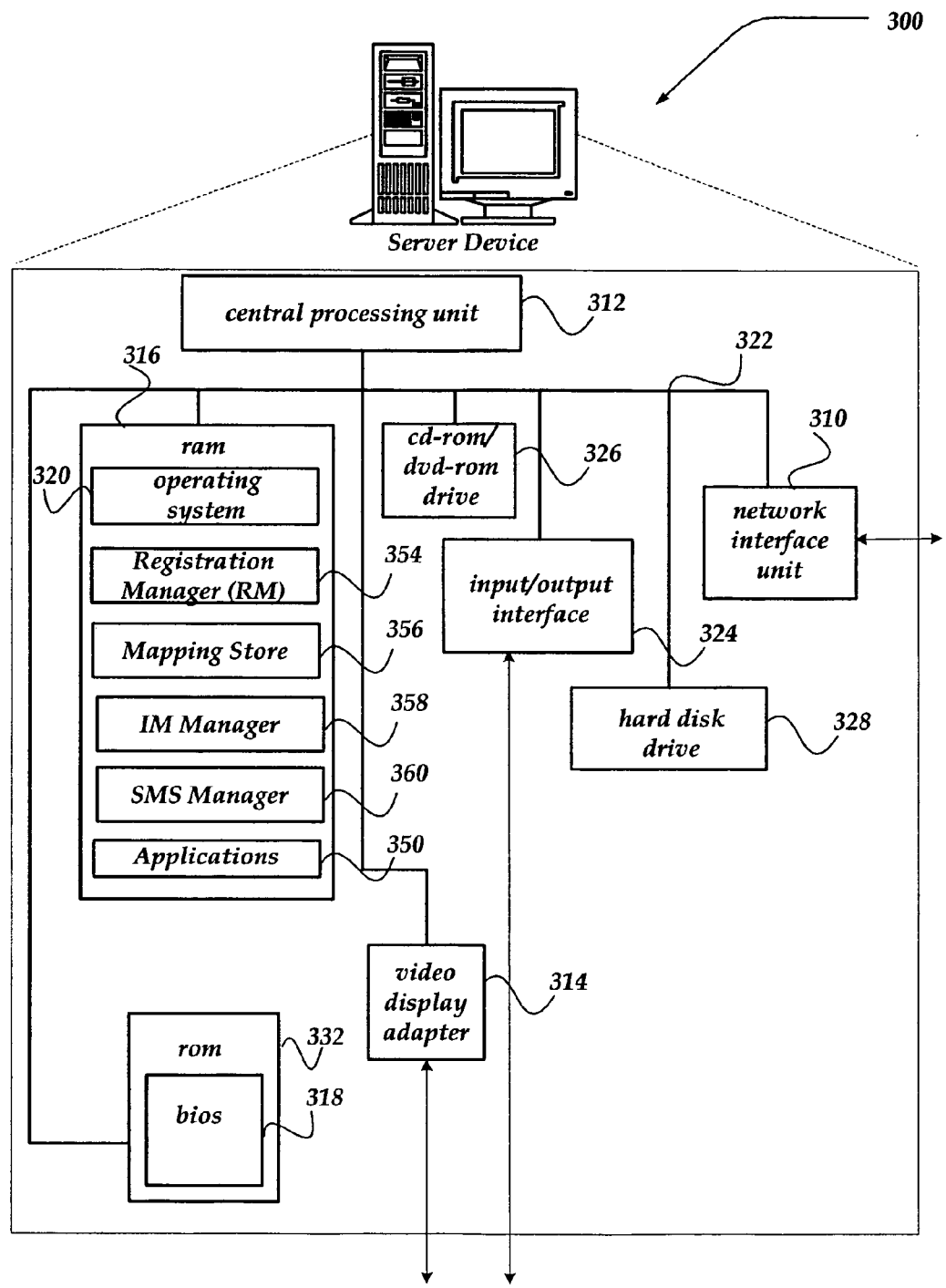
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, represent RS 106 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Mass storage may further include applications such as Registration Manager (RM) 354, mapping store 356, IM manager 358, and SMS manager 360.

IM manager 358 includes virtually any server application configured to manage an instant message session with another computing device. Similarly, SMS manager 360 includes virtually any server application configured to manage an SMS message session with another computing device. Although only these two protocol managers are illustrated, it is clear that the invention is not so limited and virtually any message protocol manager may be employed.

RM 354 is configured to enable an end-user to register a mobile device to be useable for managing an IM session, and/or other communications sessions. RM 354 may receive a registration message from a mobile device, such as mobile devices 102-104 in FIG. 1, along with a mobile device identifier. RM 354 may then employ information within the registration message to register the mobile device. In addition, RM 354 may start a communications session, such as an IM session, on the mobile device. In one embodiment, RM 354 provides a message to the mobile device indicating that the mobile device is registered. The message may be provided using any of a variety of mechanisms, including a pre-determined voice message, an SMS text message, email message, and the like.

RM 354 may receive the registration message from mobile devices 102-104 as an SMS message. The registration message may be designated for use by RM 354 through the use of a common short code (CSC), sometimes known as simply short codes. Briefly, short codes are typically short strings of numbers to which a text message may be addressed and includes a common addressing scheme for participating wireless networks. Short codes are designed to provide a way to deploy interactive mobile data applications, including voting, polling, "text and win" contests, surveys, focus groups, direct marketing, live chats, games, and the like. Short codes typically are assigned to a designation. For example, in one embodiment, RM 354 may have assigned to it, the short code of "92466." However, it is clear that RM 354 may employ virtually any message destination identifier. For example, RM 354 may employ an Internet Protocol (IP) address, and the like. Thus, while short codes are employed in the illustrations, the invention is not so limited.

RM 354 may be further configured to enable a use of short code extensions, or simply "extensions" as part of the single line message. Such "extensions" may include virtually any alpha character, a numeric character, symbol, and/or any combination of alpha, numeric, and/or symbols to indicate an instruction or command to RM 354. For example, RM 354 may employ a numeric range of numbers, such as from '000' to '100.' In one embodiment, the extension '000' may represent an instruction to RM 354 that the sender requests that the sending device be registered to be useable to manage a communications session, such as an IM session, and the like. However, the invention is not constrained to this extension example. Thus, the invention may employ the text string "register," as an instruction to register the sending device, without departing from the scope or spirit of the invention.

RM 354 also may be further configured to enable the single line message to include additional commands or instructions, such as "to," to indicate that the message is to be sent to the designated short code, "in," to indicate that the message is to be sent to the designated short code and to start up an IM session on the sending device, and the like. The invention is not so limited however. For example, such an additional command to request starting up of a communications session may be embedded in an extension. For example, an extension of '010' may indicate a request to start up an IM session on the sending device, while an extension of '011' may indicate a request to start up another type of communications session, without departing from the scope of the invention.

Moreover, the single line message may include additional information, including an account identifier, and a password associated with the account identifier. However, the invention is not limited to including an account identifier/password pair. For example, any unique end-user identifier and password pair may be employed. Thus, for example, the following:

---
Send "in <unique end-user identifier> <password>" to 92466000
or
Send "register in <Account identifier> <password>" to 92466
or,
send "<unique identifier> <password>" to 92466001
(to register the device);
or
send "register <unique identifier> <password>" to 92466
--- and the like, may be sent to RM 354 to instruct it to register the sending device for the unique end-user identifier or account identifier and to further log the sending device into a communications session, such as an IM session, and the like. The identifier (mobile device identifier) associated with the sending device may be sent to RM 354 as part of the message packet, as part of another message packet, and the like. In one embodiment, the mobile device identifier is sent to RM 354 "transparent" to the end-user of the sending device.

In addition, server device 300 may be configured to manage end-user accounts that are configured to provide such services to an end-user as, for example, email, access to games, selected web pages, chat sessions, IM sessions, SMS sessions, social networks, and the like. However, the present invention is not constrained by such examples, and more or less services may be provided, without departing from the scope or spirit of the invention. In one embodiment, an account identifier and password is employable to enable an end-user to access such services, including an ability to register a mobile device. In one embodiment, the end-user accounts reside within server device 300. In another embodiment, the end-user accounts, and/or management thereof, are distributed across one or more computing devices.

Generalized Operation

Figure 4:
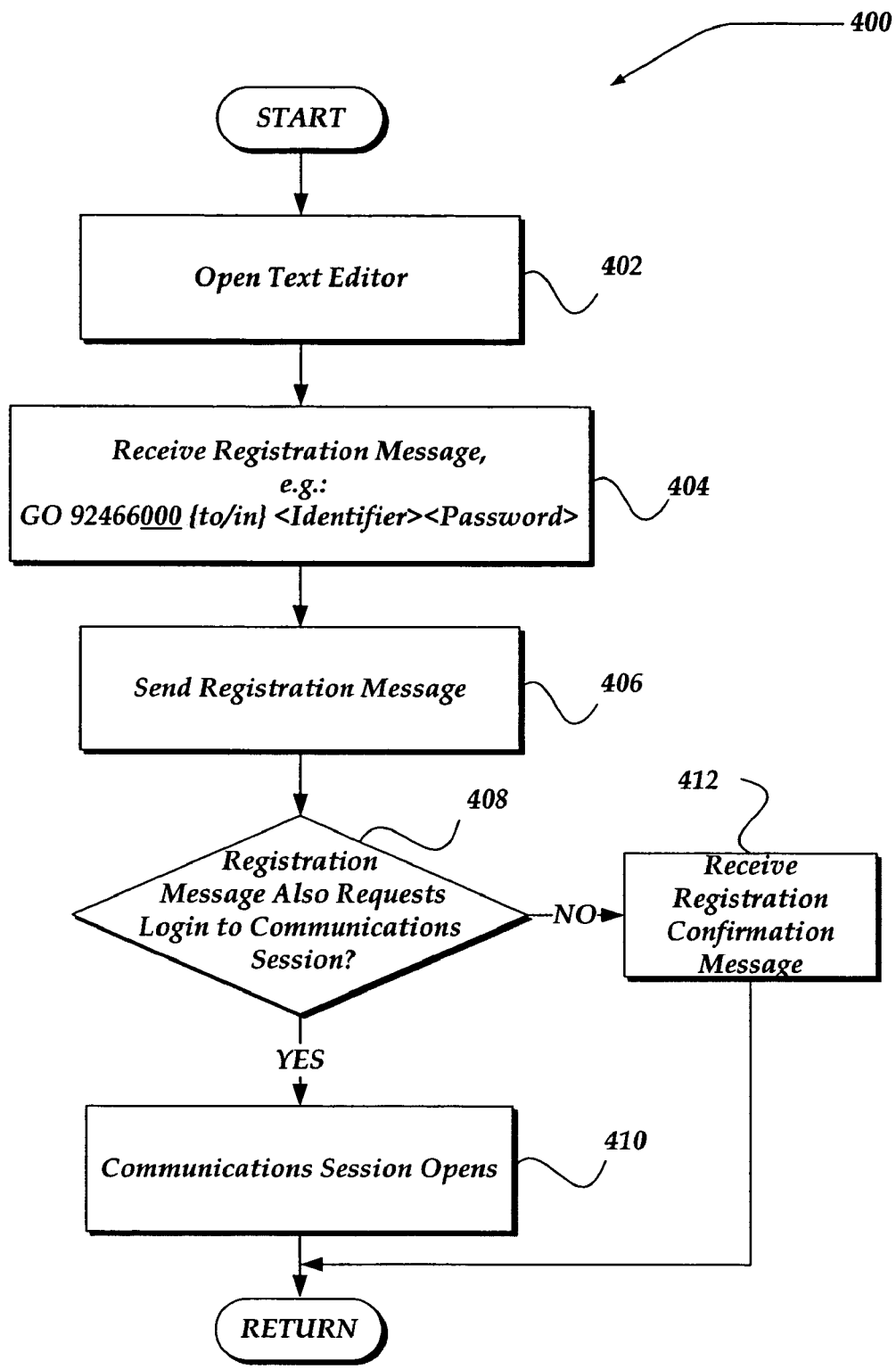
FIG. 4 illustrates a logical flow diagram generally showing one embodiment of a mobile device process for managing a registration of the mobile device over a network, to be useable with a communications session, such as an IM session.

The operation of certain aspects of the invention will now be described with respect to FIG. 4. FIG. 4 illustrates a logical flow diagram generally showing one embodiment of a process for use by a mobile device to manage a quick registration to be useable in a communications session, such as an IM session, and the like. Process 400 of FIG. 4 may be implemented in messaging client 267 of FIG. 2, and/or a similar client application of mobile devices 102-104 of FIG. 1.

Process 400 begins, after a start block, at block 402, where a client application, such as a text editor, processor, dialog box, form, script, and the like, is opened and enabled to receive text on a mobile device to be registered. In one embodiment, the client application is an SMS application opened to receive text. However, the invention is not constrained to an SMS application, and virtually any application, applet, java script, form, web page, and the like that is enabled to receive a text string may be employed.

Processing continues to block 404, where the opened application receives a registration message. The registration message may be entered as a single message line, although text wrap may be employed to display the single message line. The single message line is intended to make registration of the mobile device quick and easy by reducing such actions, as providing multiple messages, multiple text lines, and/or responding to an interactive session that may include responding to one or more requests for information. As shown in FIG. 4, one illustrative example of a single message line might include an additional command, an identifier, and a password, which may be sent to a short code (with possibly an extension in some cases). However, the invention is not constrained to these parameters within the text line, and more or less parameters may be employed. For example, the identifier may be an encoded unique identifier that may be employable to authenticate the request. In one embodiment, therefore, the identifier may be a link, a cookie, an encrypted nonce, an encryption key, and the like. In another embodiment, the password is at least a part of the identifier. Typically, however, the identifier and password are associated with an end-user account that may be supported by a service provider, application provider, content provider, and the like. Moreover, although a short code is illustrated, virtually any destination identifier may be employed. Upon completion of entry of the single message line, process 400 flows to block 406, where the registration message is sent to a destination associated with the short code. In one embodiment, the registration message is sent by the mobile device as an SMS message. However, the invention is not so limited, and virtually any messaging protocol employable to communicate a textual message may be used. In addition, the mobile device may send a mobile device identifier. The mobile device identifier may be automatically sent as part of the message, as part of another message, and the like. Typically, sending of the mobile device identifier is performed by the mobile device, potentially transparent to the end-user of the mobile device. Process then flows to decision block 408.

At decision block 408, a determination is made whether the registration message includes a request to log into a communications session, such as an IM session, on the mobile device. The request may have been included through the use of a special extension to the short code, and/or another parameter, such as a "to" parameter, and the like. If a request to start up a communications session and log into the session is included in the registration request, processing branches to block 410; otherwise, processing flows to block 412.

At block 410, the requested communications session is launched on the mobile device. Launching the communications session includes such actions as starting the communications session on the mobile device, and logging the end-user into the communications session. Logging the end-user into the communications session may be based on using the identifier, account identifier, and the like, provided within the single line text message. Upon completion of block 410, processing returns to a calling process to perform other actions, such as managing the communications session, and the like.

At block 412, the mobile device receives a message confirming that the mobile device is registered. Although not illustrated, shown registration have been unsuccessful for any of a variety of reasons, including an inability to authenticate the identifier, and the like, decision block 408 might also flow to block 412, where an error message may be provided to the mobile device. In any event, upon completion of block 412, processing returns to the calling process to perform other actions.

Figure 5:
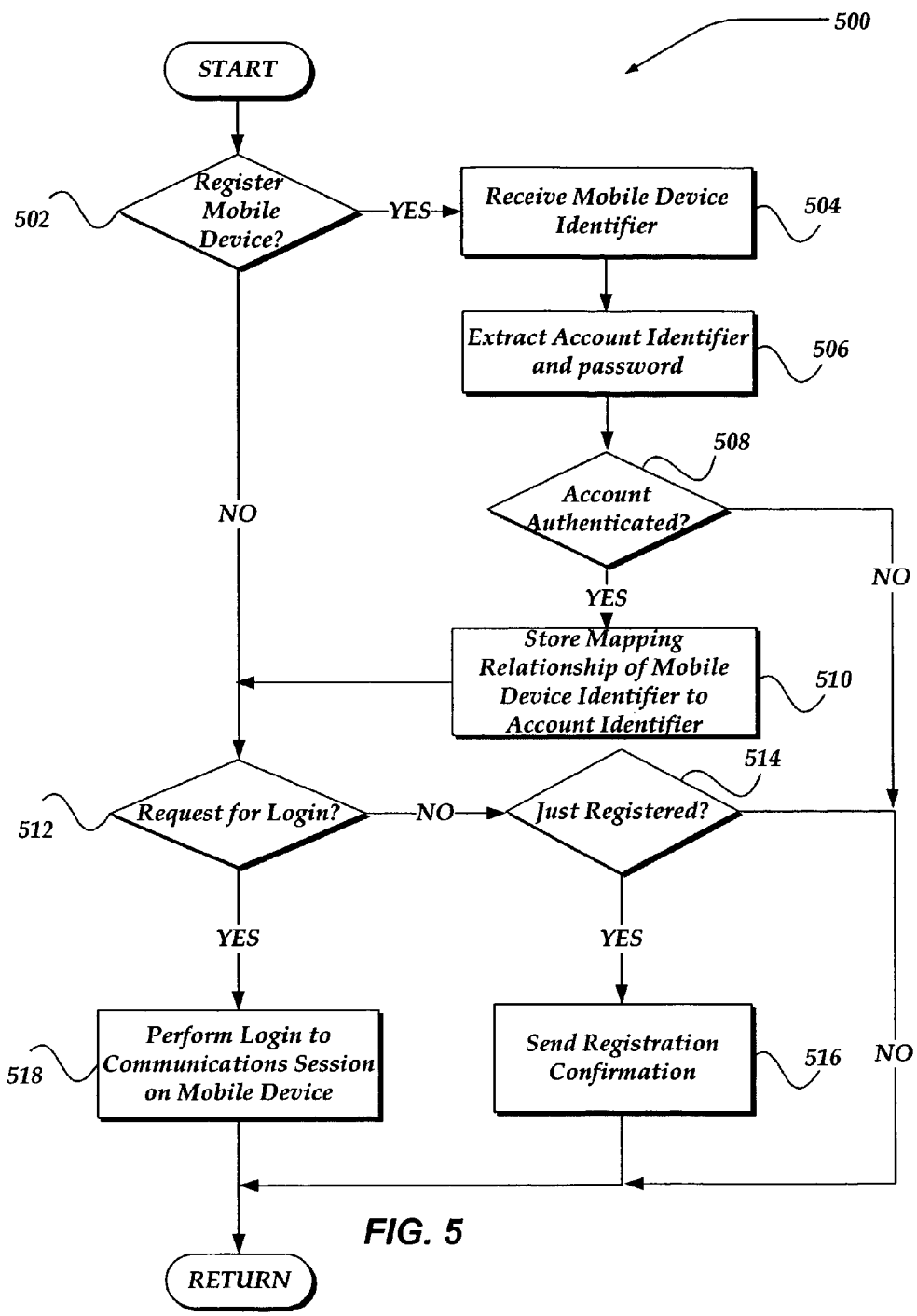
FIG. 5 illustrates a logical flow diagram generally showing one embodiment of a server device process for managing a registration of the mobile device over a network, to be useable with a communications session, such as an IM session, in accordance with the present invention.

FIG. 5 illustrates a logical flow diagram generally showing one embodiment of a server device process for managing a registration of a mobile device over a network to be useable with an IM session. Process 500 of FIG. 5 may be implemented, for example, in RS 106 of FIG. 1.

Process 500 begins, after a start block, at decision block 502, where a determination is made whether a request is received to register a mobile device. The request may, for example, be prepared and sent employing process 400 of FIG. 1. If a request is received to register a mobile device, processing branches to block 504, where a mobile device identifier is received that is associated with the request. The mobile device identifier may be received within a network packet associated with the registration request network packet, and/or another network packet. Processing then flows to block 506, where an account identifier and password are extracted from the registration request message. As noted above, the account identifier and password are not a required combination, and other configurations of information may be provided, including merely an identifier, an identifier with an embedded password, a certificate, an encryption key, and so forth.

Processing continues next to decision block 508, where a determination is made, based in part, on the account identifier and password (and/or similarly provided information), whether the registration request is authentic. In one embodiment, the account identifier and password are compared to an account associated with the account identifier and password. The account may be an account provided by a service provider, the present server system, and the like. In any event, if the request is determined to be authentic, processing flows to block 510; otherwise, processing returns to a calling process to perform other actions, such as providing an error message, and the like.

At block 510, a mapping between the mobile device identifier and the account identifier is stored. Processing then flows to decision block 512 where a determination is made whether the registration request included a request to be logged into a communications session, such as an IM session, and the like. As described above, the registration request may include a log in request using a short code extension, another instruction, and the like. If there is a request to be logged into a communications session, processing flows to block 518; otherwise, processing flows to decision block 514. The registration confirmation may be sent in either case, if the mobile device was successfully registered in this request.

At decision block 514, a determination is made whether the requesting device was just successfully registered. If the requesting device was not just registered, then processing returns to the calling process to perform other actions. However, if the requesting device was just successfully registered, then process 500 flows to block 516, where a confirmation message is provided to the requesting device. In one embodiment, the confirmation message is sent as an SMS message. However, the invention is not so limited. For example, the confirmation message may also be sent as an email, voice message, and the like. Upon completion of block 516, processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing a registration of a mobile device over a network, comprising:
   entering into a client application by a user a single line message, wherein the single line message includes an account identifier, and a password associated with the account identifier, and a short code extension that indicates an instruction to register the mobile device;
   sending the single line message over the network; and
   if the account identifier and password are authenticated, receiving a confirmation that the mobile device is registered based on receipt of the single line message including the short code extension, wherein registration includes a mapping between the account identifier and a mobile device identifier associated with the mobile device.

2. The method of claim 1, wherein the short code extension further comprises at least one of a text string that includes a word "register," and a numeric value of zero.

3. The method of claim 1, wherein sending the single line message further comprises employing a short code to identify the destination of the message.

4. The method of claim 1, wherein if the account identifier and password are authenticated further comprises, employing a server to determine if the account identifier and password are associated with a valid, pre-existing account.

5. The method of claim 1, further comprising, if the registration instruction further includes a request to log into the IM session, enabling a remote server to perform an action to start the IM session on the mobile device.

6. The method of claim 1, wherein the message is sent employing Short Message Service (SMS) protocol.

7. The method of claim 1, wherein the method is executable on the mobile device.

8. The method of claim 1, wherein the client application comprises at least one of a text processing application, and an SMS application.

9. A mobile device for use in managing a registration over a network, comprising:
   a display;
   a transceiver for receiving and sending information between another computing device;
   a processor in communication with the display and the transceiver; and
   a memory in communication with the processor and for use in storing data and machine instructions that cause the processor to perform a plurality of operations, including:
      entering a single line message by a user, wherein the single line message includes an identifier, password, and a short code extension, wherein the short code extension is associated with an instruction to register the mobile device to be useable for managing a communications session from the mobile device;
      sending the single line message over the network; and
      if the identifier is authenticated, receiving a confirmation that the mobile device is registered based on receipt of the single line message including the short code extension, wherein registration includes a mapping between the identifier and a mobile device identifier associated with the mobile device.

10. The mobile device of claim 9, wherein the single line message further comprises a password associated with the identifier.

11. The mobile device of claim 9, wherein the communications session further comprises at least one of an IM session, an IRC session, a video conferencing session, and a chat session.

12. The mobile device of claim 9, wherein the identifier further includes at least one of a password, an encryption key, and a nonce.

13. The mobile device of claim 9, wherein if the identifier is authenticated, further comprises receiving in the single line message a password associated with the identifier and employing the identifier and the password to determine authentication of the identifier.

14. The mobile device of claim 9, wherein receiving a confirmation that the mobile device is registered, wherein the confirmation is received as at least one of an SMS message, an audio message, and an email message.

15. A server device for use in managing a registration of a mobile device over a network, comprising:
   a transceiver for receiving and sending information between the mobile device;
   a processor in communication with the transceiver; and
   a memory in communication with the processor and for use in storing data and machine instructions that cause the processor to perform a plurality of operations, including:
      receiving, from the mobile device, a message entered by a user, wherein the message is a single lined message;
      receiving a mobile device identifier associated with the mobile device;
      determining a short code extension included in the single lined message, wherein the short code extension indicates a request to register the mobile device for use in managing a communications session;
      extracting from the message an account identifier and password;
      if the account identifier and password are authentic, storing a mapping relationship of the mobile device identifier to the account identifier, wherein the mapping enables the mobile device to be registered for use in the communications session; and
      if the message includes a request to log into the communications session, using the mapping, in part, to start the communications session on the mobile device.

16. The server device of claim 15, wherein the mobile device identifier is at least one of a phone number, a Mobile Identification Number (MIN), and an electronic serial number (ESN).

17. The server device of claim 15, wherein the communications session further comprises at least one of an IM sessions, an IRC session, a video conferencing session, and a chat session.

18. The server device of claim 15, wherein receiving, from the mobile device, the message further comprises receiving the message as an SMS message.

19. A system for use in managing a registration over a network, comprising:
   (a) a mobile device that is configured to perform actions, including:
      sending a message entered by a user, wherein the message is a single lined message that comprises at least an identifier and a credential; and
      if the message is successfully authenticated and includes a request to log into a communications session, enabling the communications session to automatically start up on the mobile device; and
   (b) a server device that is configured to perform actions, including:
      receiving the message;
      receiving a mobile device identifier associated with the message;
      determining if the message includes a request to register within a short code extension the mobile device for use in managing the communications session, and if the message includes the request to register the mobile device:
         determining if the identifier is authentic, and if the supplied credential is valid, storing a mapping relationship of the mobile device identifier to the identifier, wherein the mapping enables registration of the mobile device for use, at least in part, in the communications session, registering the mobile device, and if the credential is valid and includes the request to log into the communications session, automatically starting up the communications session on the mobile device.

20. The system of claim 19, wherein the communications session further comprises at least one of an IM session, an IRC session, a video conferencing session, and a chat session.

21. The system of claim 19, wherein sending the message further comprises employing the short code extension to identify the destination of the message.

22. An apparatus for use in managing a registration of a mobile device over a wireless network, comprising:

a transceiver configured to receive and to send a message over the wireless network; and a processor, coupled to the transceiver, that is arranged to perform actions, including:

a means for receiving, from the mobile device, a message, wherein the message is a single lined message entered by a user of the mobile device;

a means for receiving a mobile device identifier associated with the mobile device;

a means for determining from the message a registration request means, wherein the registration request means enables a request to register the mobile device for use in managing communications session;

a means for determining an identifier and a credential associated with the message;

if the identifier is authentic and the credential is valid, a means for storing a mapping relationship of the identifier to the identification, wherein the mapping enables registration of the mobile device;

means for employing the mapping, in part, to register the mobile device; and if the message includes a request to log into the communications session, using the mapping, in part, to employ a means to start the communications session on the mobile device.

* * * * *